United States Patent
Radune

[15] 3,696,485
[45] Oct. 10, 1972

[54] METHOD AND APPARATUS FOR MAKING AN ANTIFRICTION BEARING RETAINER

[72] Inventor: Karl F. Radune, New Britain, Conn.
[73] Assignee: Textron Inc., Providence, R.I.
[22] Filed: March 5, 1971
[21] Appl. No.: 121,265

[52] U.S. Cl. .............................................29/148.4 C
[51] Int. Cl. .................................................B21d 53/12
[58] Field of Search.......29/148.4 C, 148.4 A, 200 B, 29/200 R

[56] References Cited
UNITED STATES PATENTS
3,026,601   3/1962   Potter...................29/148.4 C

*Primary Examiner*—Thomas H. Eager
*Attorney*—Sandoe, Hopgood and Calimafde

[57] ABSTRACT

The invention contemplates a retainer ring for maintaining the angular spacing of rolling elements in an antifriction bearing, said ring being the product of a method and apparatus for precisely staked definition of element-retaining lugs prior to assembly of the rolling elements thereto. The ring material displaced by staking is limited by anvil formations which determine the precise spacing. Tolerances may be so closely set and held that rolling-element assembly to such a retainer ring involves only light radial pressure to transiently but not permanently deform the lug regions in a snap or detent action. The invention is described in application to roller-element retention and to ball-element retention, whether the retention is to be against radially inward loss (of rolling elements) or radially outward loss, or both.

14 Claims, 16 Drawing Figures

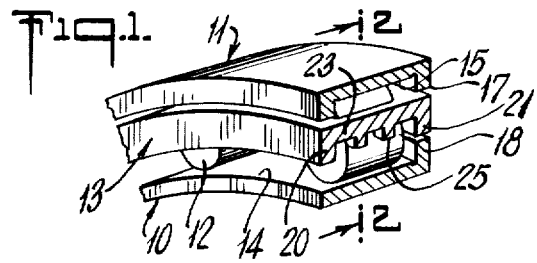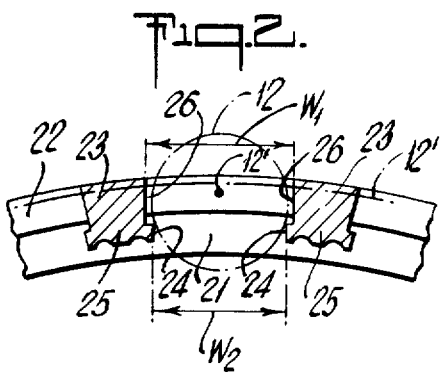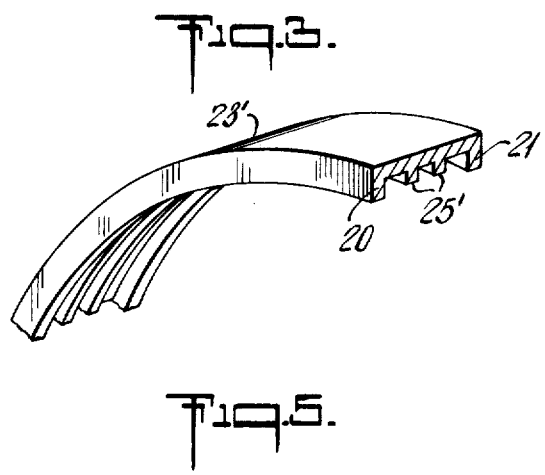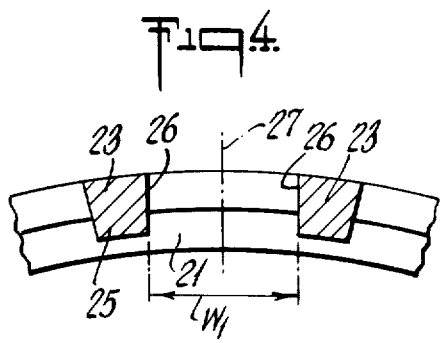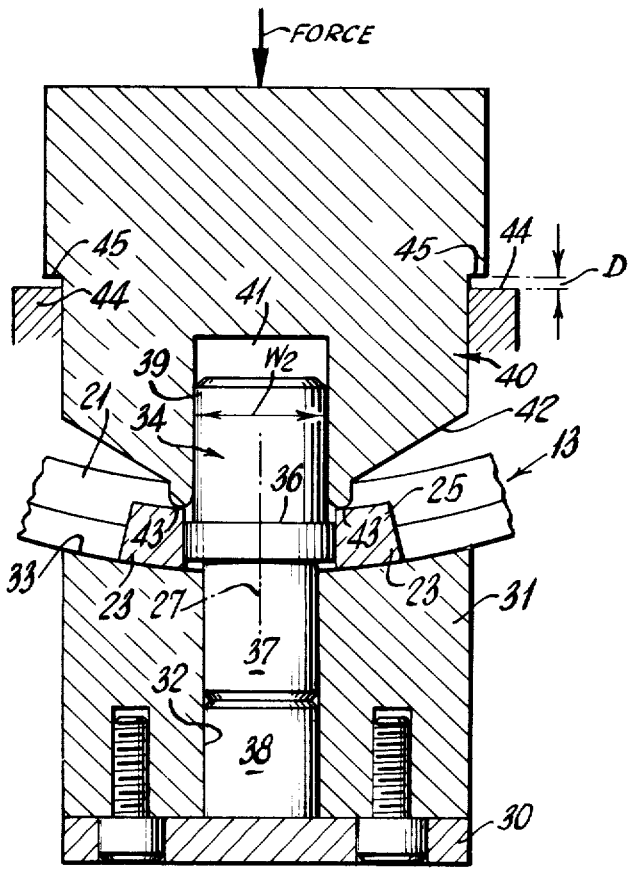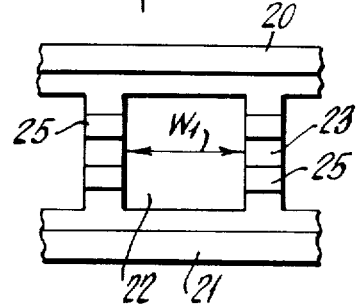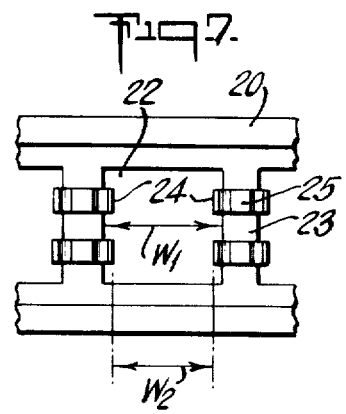
INVENTOR
KARL F. RADUNE

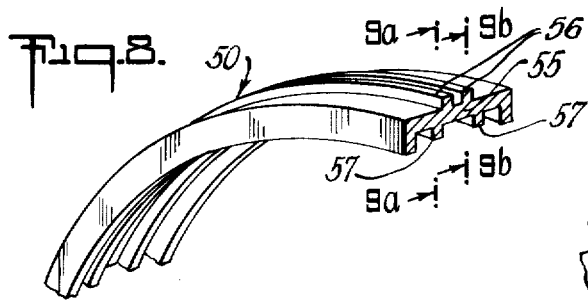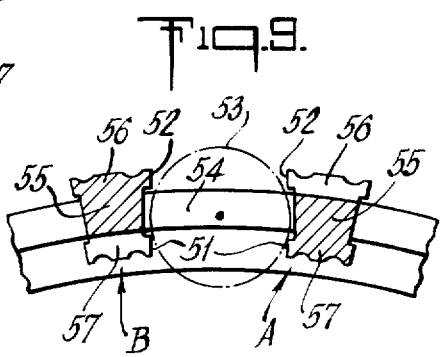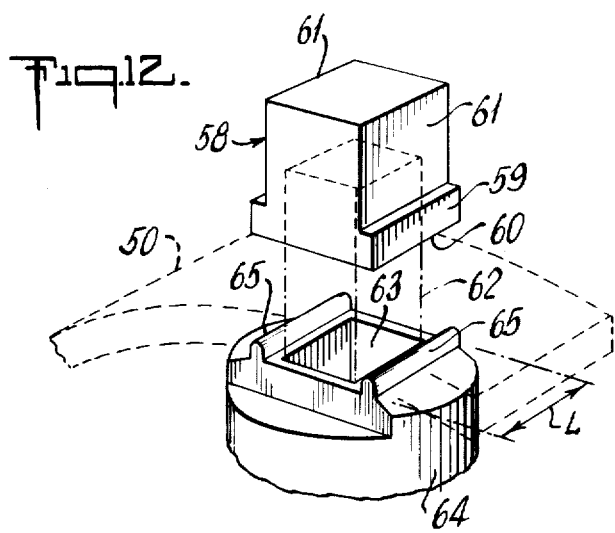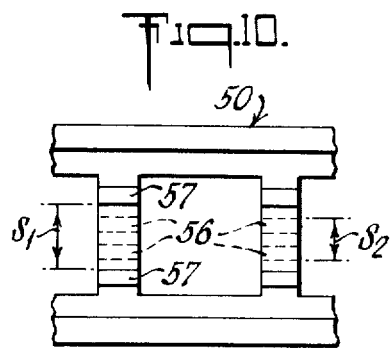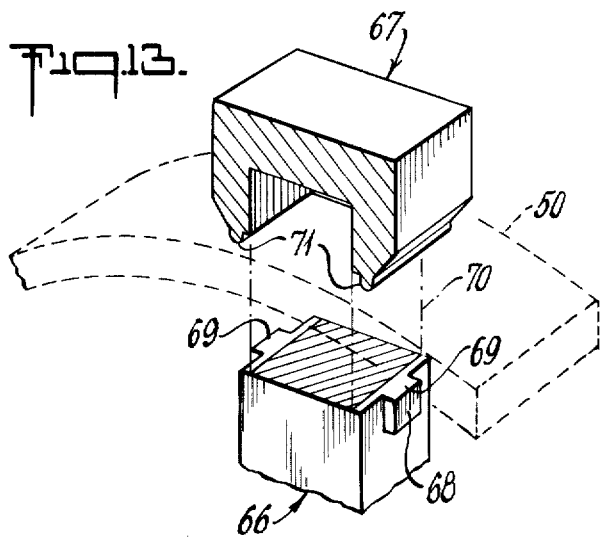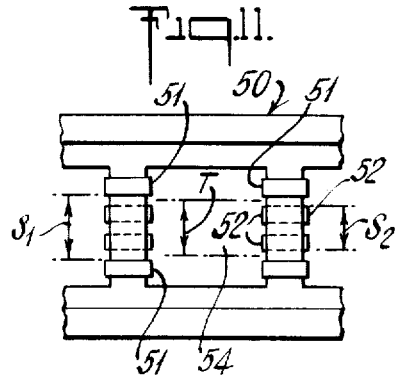
INVENTOR
KARL F. RADUNE INVENTOR
KARL F. RADUNE
BY
Sandoe, Hopgood & Calimafde
ATTORNEYS

METHOD AND APPARATUS FOR MAKING AN ANTIFRICTION BEARING RETAINER

This invention relates to retainer rings of the deformable type, for roller-element retention in an antifriction bearing.

One of the most common techniques to retain the spacing of rolling elements in an antifriction bearing is to use a pocketed retainer of ductile material, and to retain each rolling element in its pocket by locally deforming such material to form small opposed retaining lugs, spaced less than the rolling diameter of the rolling element. Staking or like metal-displacing operations are conventionally performed to accomplish these ends, the staking or other blows being performed after rolling element insertion; and there is always uncertainty as to the precise spacing of opposing lugs and as to whether the rolling element has been adversely affected by the staking blow or force. Other and much more expensive techniques exist whereby all desired lug formations are the product of precision machining, involving the cut removal of metal, as distinguished from mere swaging, peening, or other metal displacement as may occur in a staking operation.

It is an object of the invention to provide an improved method and tooling for precision-staking of retainer lugs of the character indicated.

Another object is to achieve the foregoing object with a method and tooling which can perform precision staking or the like operations prior to rolling-element assembly to the retainer.

A specific object is to meet the above object with such precision and control that rolling-element assembly to the retainer may involve elastic (i.e., non-permanent) deformation of the retaining lug regions, in a simple finger-pressing, detent snap action.

Another specific object is to meet the foregoing objects with a method which is basically applicable to roller or ball retention, regardless of the radial direction of rolling-element loss to be avoided.

A further specific object is to provide a precision retainer ring construction of the character indicated, without dependence upon such inherently expensive techniques as one or two-stage broaching, contour-boring, or cherry-reaming of rolling-element pockets.

A general object is to meet the above objects with basically simple operations and tooling, whereby precision and reliability are achieved at low cost and without chance of harm to a single rolling element.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

FIG. 1 is a fragmentary view in perspective of an antifriction bearing which contains a rolling-element retainer of the invention, one end of the fragment being cut in a longitudinal section, to reveal internal relationships;

FIG. 2 is an enlarged fragmentary sectional view of the retainer part of FIG. 1, the sectional plane being in the radial plane designated 2—2 in FIG. 1;

FIG. 3 is a view similar to FIG. 1 but showing only the blank for the retainer part, prior to completion of manufacturing operations;

FIG. 4 is a view similar to FIG. 2 but showing only the part of FIG. 3, in a later stage of manufacture;

FIG. 5 is a vertical sectional view through tooling of the invention, as used to convert the retainer ring of FIG. 4 to the condition displayed in FIG. 2;

FIGS. 6 and 7 are similar simplified fragmentary views on a reduced scale to show the same radially viewed aspect of a retainer pocket, for the FIG. 4 and FIG. 2 conditions, respectively;

FIG. 8 is a fragmentary view in perspective to illustrate a modified retainer ring;

FIG. 9 is a view similar to FIG. 2, for the case of the retainer ring of FIG. 8, the sectioned regions designated A and B being respectively taken at the planes 9a—9a and 9b—9b of FIG. 8;

FIGS. 10 and 11 are views similar to FIGS. 6 and 7, respectively, for the case of the retainer ring of FIG. 8;

FIG. 12 is a simplified view in perspective to illustrate first tooling used in converting the ring of FIG. 8, from the FIG. 10 to the FIG. 11 situation;

FIG. 13 is a similar view in perspective to illustrate further tooling used to achieve the FIG. 11 situation;

Figure 14:
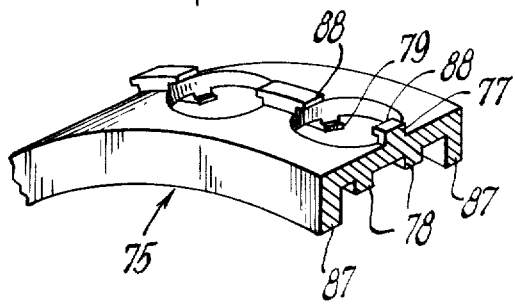
FIG. 14 is a fragmentary view in perspective to illustrate a further modified retainer ring.

Briefly stated, the invention contemplates a retainer ring for maintaining the angular spacing of rolling elements in an antifriction bearing, said ring being the product of a method and apparatus for precisely staked definition of element-retaining lugs prior to assembly of the rolling elements thereto. The ring material displaced by staking is limited by anvil formations which determine the precise spacing. Tolerances may be so closely set and held that rolling-element assembly to such a retainer ring involves only light radial pressure to transiently but not permanently deform the lug regions in a snap or detent action. The invention is described in application to roller-element retention and to ball-element retention, whether the retention is to be against radially inward loss (of rolling elements) or radially outward loss, or both.

In FIG. 1, the invention is shown in application to an antifriction bearing, comprising inner and outer bearing rings 10-11. Plural antifriction rolling elements such as rollers 12 are spaced from each other by successive pockets of a retainer ring 13, and the rollers 12 ride oppose raceways 14–15 in the respective rings 10–11. As shown, the outer ring 11 has radially inward end flanges 16–17, at opposite ends of the raceway 15; and the retainer has lug formations of the invention to assure a unit-handling relation of the rollers 12, retainer 13 and outer ring 11, i.e., to assure against radially inward loss of rollers 12 if this unit-handling assembly has not been applied to the inner ring 10. As shown, the inner ring 10 is flanged (at 18) at one end, and the raceway 14 is open at the other end to permit assembly and disassembly with respect to the inner ring 10.

The retainer 13 is of solid ductile metal construction and may be machined, cast, or otherwise formed. Basically, it comprises a single annular body with radial inner and outer limits to clear the bearing rings 10–11; as shown, its outer surface is cylindrical, at a radius to closely clear and thus derive piloting support from the otter-ring flanges 16–17. Radially inward flanges 20–21 are provided outside the axial limits of the rolling elements 12, the flange 21 having clearance with the inner ring flange 18. The element-retaining pockets 22 are provided between flanges 20–21 at equal angularly spaced locations, leaving bridges 23 between pockets, as best seen in the enlarged fragmentary view of FIG. 2. Retaining lugs 24 project to narrow the gap between adjacent bridges 23 and to hold each roller from radially inward loss; as shown, the lugs 24 are integral with the radially inner limits of pedestals 25, depending from axially spaced locations on each bridge 23. The spacing $W_1$ between opposed pocket sidewalls 26 is slightly in excess of the rolling diameter of elements 12, and the corresponding spacing $W_2$ between opposed sidewalls of the lugs 24 is slightly less than said diameter. In FIG. 2, the roller 12 is shown for the situation wherein lugs 24 are retaining the same against radially inward loss, the roller center being shown by a heavy dot 12'. However, when rollers 12 are riding the raceways 14–15, the locus of ball centers is elevated, as shown by the phantom arc 12". It will be understood that the angular offset of lugs 24 (i.e., difference between $W_1$ and $W_2$) is such, in terms of the roller diameter and of the radial offset of lugs 24 from circle 12", that in normal operation the rollers 12 never contact the lugs 24 but, rather, they only contact one of the sidewalls 26, depending on the direction of bearing rotation. The invention is concerned with the facile, inexpensive and reliable achievement of this condition, in such manner that rolling element to obtain the indicated unit-handling subassembly may involve radially outward pressing of each rolling element into its pocket past a resilient detent interference with lugs 24.

FIGS. 3 and 4 illustrate initial preparation of the retainer ring 13.

First, a blank (FIG. 3) may be turned or otherwise formed, comprising a central body 23' with the inward end flanges 20–21, and with radially inward circumferential ridges 25' between flanges 20–21. The pocket openings may be made by suitably indexed radially inward drilling of the body 23', followed by radial broaching to achieve a desired roller-guiding cross-section. Thus prepared, the bridges 23 are defined, with walls 26 that are parallel and symmetrically positioned at opposite offsets from the radial alignment or axis 27 of drilling and broaching. The lug formations 24 are then prepared by staking, to displace material of pedestals 25, to the presisely controlled spacing $W_2$, using tooling as illustrated in FIG. 5. FIGS. 6 and 7 serve to illustrate another comparative view of the conditions before and after staking.

The tooling of FIG. 5 comprises a base plate 30 on which is mounted a ring-supporting block 31 having a vertical-alignment bore 32 and an arcuate supporting surface 33. Since the lug formations 24 are to be struck from the radially inner region of the retainer ring 13, the surface 33 is concave, with curvature matching that of the outer surface of ring 13; a fragment of the ring 13 is shown thus supported, with a pocket axis 27 in register with the axis of bore 32, placing adjacent bridges 23 at symmetrical offsets from the bore 32.

An anvil tool or plug 34, as of suitably hardened tool steel, includes a central body 35 of cross-section to pilot on and locate a retainer pocket 22. The top surface is in a plane normal to the axis of bore 32 and defines an anvil-table portion 36. An integral shank end 37 is of cross-section to pilot on and be located by the bore 32, and a plug element or dowel 38 of selected length is placed in the lower end of bore 32 to provide an elevation reference for the anvil-table portion 36. Upwardly projecting from the anvil-table portion 36 is an elongated integral stud 39 which performs a guiding function for a staking tool 49, at telescoped engagement of stud 39 with a bore 41 in tool 40; tool 40 may also be of suitably hardened tool steel. For the roller situation under discussion, the stud 39 may be of round, square or rectangular cross-section and is symmetrical with respect to the anvil-tool axis; the spacing between the stud sidewalls which are adjacent bridges 23 is the precise lug spacing $W_2$, already defined. These stud walls are thus symmetrically set back from the corresponding limits of the anvil-table portion 36, and the elevation of the anvil-table portion 36 is selected to be intermediate the radially inner and outer limits of pedestals 25, as shown.

The lower end of staking tool 40 is relieved or beveled at 42 to project like rounded staking ribs or the like formations 43 for contact with adjacent edges of pedestals 25; it will be understood that, for the roller retainer 13 shown, formations 43 are elongated in the direction perpendicular to the drawing, so that each formation 43 will at least overlap and be operative upon two axially spaced pedestals 25. Staking proceeds by compressional downward loading of tool 40, as suggested by the "FORCE" arrow in FIG. 5; the action is to squeeze retainer 13 between the tool 40 and base 30–31. The action may be by hammer blows (intermittent) or by steady application of force, until material at the stressed region of the ductile pedestals 25 is caused to displace laterally into limiting contact with adjacent sidewall regions of the stud 39; in the course of such displacement, the flow of retainer material is also limited by the anvil-table surface 36, resulting in simultaneous and precise formation of all four lugs 24 for a single pocket 22. If desired, fixed stop means 44 may intercept a shoulder or other abutment 45 on tool 40 after it has gone through a predetermined displacement D, which has been ascertained to produce exactly the desired movement of ductile material to produce lugs 24.

The described operation is, of course, repeated for each pocket 22 until all lugs 24 have been formed. The subassembly 11–12–13 is then produced by placing the retainer 13 within outer ring 11, and by then pressing rollers 12 radially outwardly past the snap-detent action at lugs 24. No permanent lug deformation results from such insertion; neither is there any chance of harming the rollers 12.

FIGS. 8 and 9 illustrate a modification wherein a retainer ring 50 is equipped with plural radially inner lugs 51 and radially outer lugs 52 to permit snap-insertion of rollers 53 in their respective pockets 54, and so that retainer 50 and its rollers 53 may be a unit-handling subassembly.

Preliminary manufacture proceeds as previously described, starting with a suitably flanged blank or annulus, in which pocket openings 54 have been formed, to define the bridges 55 between pockets. The primary difference from the previously described form is that in FIGS. 8 and 9, the blank has axially spaced circumferential ribs 56 on its outer surface, as well as such ribs 57 projecting radially inwardly; these ribs become pedestals after pocket formation, and so the same reference numbers are used, as applicable. The axial spacing $S_1$ of ribs 57 exceeds the overall axial spacing and extent $S_2$ of ribs 56, as well be apparent from legends in FIGS. 10 and 11.

Staking to form lugs 51–52 may be a two-stage procedure, successively using the tools of FIGS. 12 and 13 respectively. FIG. 12 will be understood to depict, on a simplified basis, tooling as in FIG. 5, wherein an anvil tool 58 has a body 59 to locate in pocket 54 and an anvil-table portion 60 (facing down and therefore visible only at an edge thereof); the shank 61 is shown square, for guidance as appropriate, as in the base bore 32 of FIG. 4. For simplified showing, the projecting stud portion is shown only by light-phantom lines 62, and is suitably guided in the bore 63 of a staking tool 64. Upwardly projecting staking formations 65 extend at length L which is at least sufficient to straddle adjacent edges of both pedestals 51 on each applicable pocket side. Deformation proceeds as already described, resulting in precisely positioned lugs 51, to retain rollers 53 against radially inward loss.

Having thus formed all lugs 51, the outer lugs 52 are formed with tooling as in FIG. 13, comprising an anvil tool 66 and a complimentary staking tool 67. These elements are basically similar to what has already been described, except that the body portion 68 of the anvil tool 66 is relieved or cut away at its axial ends in order to clear the already formed inner lugs 51; thus body portions 68 are like opposite lateral projections, stabilizing on the retainer-pocket walls and of width T (FIG. 11) to axially overlap both ridges 56 and at the same time to clear lugs 51. Anvil-table portions 69 of adequate size are nevertheless provided adjacent the upwardly projecting walls of the stud portion 70 of the anvil; again, for simplicity, phantom outlines suggest stud portion 70, shown rising from the sectioned outline of its base. The staking tool 67 is guided on stud 70 and has staking projections 71, which may be as described at 65 (FIG. 12) and 43 (FIG. 4). Again, deformation proceeds through compressed displacement of stressed pedestals (56), to form the outer lugs 52. Roller-insertion is by snap-detent action, radially inwardly or radially outwardly.

Figure 15:
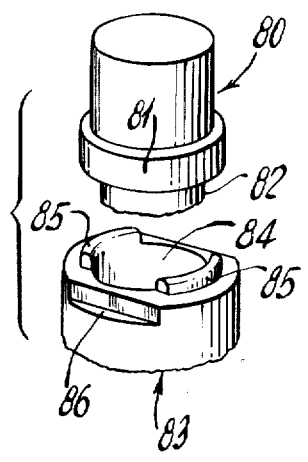
FIGS. 15 and 16 respectively illustrate tooling successively used to perform metal-displacing operations in the manufacture of the ring of FIG. 14.
Figure 16:
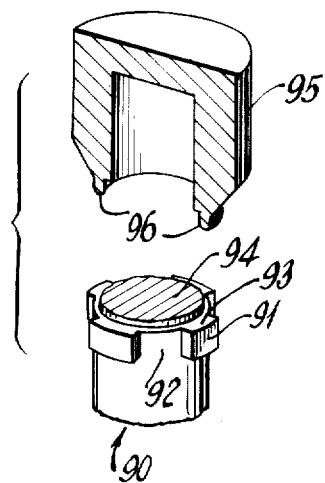

In FIGS. 14, 15 and 16, I show application of the invention to the manufacture of a retainer ring 75 for retaining balls (not shown), as the antifriction rolling elements.

The ring 75 may be initially a blank as described for either of the roller-bearing applications (FIGS. 3, 6, 10), but of course ball pockets 76 are cylindrical rather than of rectangular cross-section. In the form shown, the ring blank has a single circumferential outer ridge which becomes a radially outward pedestal 77 upon forming the pockets 76; similarly, two inner circumferential ridges become radially inward pedestals 78, axially spaced more than the effective width of ridge 77, upon pocket formation.

To create the inner ball-retaining lugs 79 from pedestals 78, the tooling of FIG. 15 operates completely analogously to that of FIG. 12, except that of course arcuate contours replace square or rectangular shapes. Thus, anvil tool 80 has a cylindrical body 81 to stabilize in the bore of a pocket 76, and a projecting cylindrical stud portion 82 for piloting the staking tool 83 at its bore 84. The diameter of stud portion is the dimension $W_2$, to establish a radially inner precision reference for lugs 79. The staking tool projections 85 are arcuate about the tool axis, for an angular span which encompasses both ridges 78. Tool-relief at 86 assures clearance with respect to the retainer side flanges 87 (see FIG. 14). Tool compression locally deforms material of ridges 78 to produce lugs 79.

The tooling of FIG. 16 accomplishes formation of lugs 88 from the material of ridge 77, in a manner analogous to operation of the tooling of FIG. 13. Thus, an anvil tool 90 has a body 91 which is suitably relieved, as at 92 to enable clearance of the lugs 79, upon insertion in a pocket 76 in the radially outward direction; nevertheless, the body 91 is fully stabilized in the pocket 76, leaving an anvil-table region 93 to define the precise radially inner limit of a lug 88. A cylindrical stud portion 94 projects upward for guidance of the staking tool 95 and is of the diameter $W_2$, for reasons previously explained. Arcuate or circular staking means 96 projects downwardly to stress adjacent edges of pedestals 77, to form lugs 88, as will be understood.

It will be seen that I have described improved retainers, and methods and apparatus for making the same, achieving all stated objects. Precision of roller or ball-drop control is achieved, while using the relatively inexpensive technique of staking; and rolling elements are undamaged because staking occurs prior to ball or roller assembly. No permanent deformation takes place in the retainer, as a result of ball or roller assembly, because clearances have been so well held that elastic deformation is all that is involved in the snap-detent assembly of rolling elements. Retention lugs are small and strong, eliminating the danger of breakage. The retention can be checked and inspected after staking and before bearing assembly. Not only are lug spacings accurately controlled, but so also are the size and shape of the lugs.

While the invention has been described for the preferred forms and methods shown, it will be understood that modifications may be made without departing from the scope of the invention.

What is claimed is:

1. The method of making a staked retainer ring for retaining plural elements of a given rolling diameter in an antifriction bearing, said method comprising providing an annulus of ductile material wherein the inner and outer radial limits of the annulus are within the extreme inner and outer running radial limits of the antifriction elements in the bearing, the axial width of the annulus exceeding the axial extent of the running locus of the antifriction elements in the bearing, one of the inner and outer surfaces of said provided annulus having a radially projecting circumferential ridge of relatively small axial extent intermediate the axial ends of the annulus, forming plural element-pocket openings radially of the axis of the annulus at an axial region which intersects said ridge and at angularly spaced locations about said axis, each of the radial openings being of substantially constant cross-section sufficient to clear an inserted antifriction element, selecting an anvil tool of size to pilot on the wall of a pocket, positioning said anvil tool within a pocket at a radial location within the radial extent of adjacent ridge portions, the selected anvil tool having integral anvil formations projecting radially beyond and adjacent to each of said ridge portions, said projecting formations being spaced from each other by less than said diameter and respectively defining limits of potential inward deformation of said ridge portions, and delivering radially directed staking blows at said ridge portions in the direction of said anvil tool, the force of said blows being sufficient to displace ridge-portion material into limiting contact with the respective projecting formations.

2. The method of claim 1, in which the ridge is selected on the radially outer periphery of the annulus, in which the anvil tool is positioned to face radially outwardly, and in which the staking blows are directed generally radially inwardly.

3. The method of claim 1, in which the ridge is selected on the radially inner surface of the annulus, in which the anvil tool is positioned to face radially inwardly, and in which the staking blows are directed generally radially outwardly.

4. The method of claim 1, in which the ridge is one of two, selected one on each of the respective inner and outer surfaces of the annulus, one of said ridges being selected at an axial region offset from that of the other of said ridges; and in which, after said staking of the adjacent ridge portions for a first of said two ridges, an anvil tool is selected to clear the first-deformed ridge portions and is inserted in and piloted on the wall of the pocket opening in the direction to pass the deformed ridge portions and to position the same at a radial location within the radial extent of the second of said two ridges, the latter selected anvil tool having integral anvil formations projecting radially beyond and adjacent to each of the ridge portions of said second ridge, said last-mentioned projecting formations being spaced from each other by less than said diameter and respectively defining limits of potential inward deformation of said ridge portions, and delivering radially directed staking blows at the last-mentioned ridge portions, the force of said last-mentioned blows being sufficient to displace ridge-portion material into limiting contact with the last-mentioned respective projecting formations.

5. The method of claim 1, in which a staking tool is selected and used to deliver said blows, said staking tool being piloted on said anvil tool in the course of delivering said blows.

6. The method of claim 1, in which said annulus is selected with two axially spaced ridges projecting in the same direction from the same one of said inner and outer surfaces, in which the pocket openings intersect both ridges, in which the anvil tool and its radially projecting integral formations are adjacent both ridges, and in which the staking blows are delivered at ridge portions of both said ridges.

7. The method of claim 1, in which the cross-section of pocket openings is formed essentially rectangular, whereby roller antifriction elements of said diameter may be retained by the deformed material of said annulus.

8. The method of claim 1, in which the cross-section of pocket openings is formed essentially cylindrical, whereby ball antifriction elements of said diameter may be retained by the deformed material of said annulus.

9. The method of claim 1, in which the amount by which said projecting formations are spaced is just short of the said diameter, the difference between such spacing and said diameter being such in relation to the elastic properties of the annulus material that an antifriction element may be pressed into a pocket by transient elastic deformation of the displaced-material regions, short of reaching the yield point of the said material.

10. Anvil and staking tool means for the precise staked formation of element-retaining lugs in the retainer ring of an antifriction bearing, comprising an anvil-tool element having a central elongated axis and including an anvil-table portion normal to said axis and of outer dimensions to pilot on the bore of a radially directed pocket opening in a retainer for rolling elements in the bearing, a staking-tool element having a central elongated axis and including like axially directed staking projections at diametrically spaced locations with respect to the staking-tool element axis, the spacing of said projections being substantially the span of the pocket opening in the rolling direction of a rolling element, telescoping guide means coacting between said tool elements to maintain coincident orientation of their respective axes while permitting relative axial reciprocation óf said tool elements, said anvil-tool element including axially projecting sidewall formations projecting from said anvil-table portion toward said staking tool element and inwardly relieved from the full span of said anvil-table portion, said projecting formations being spaced from each other by less than the rolling diameter of the rolling element to be retained, whereby axial pressure of said tools in squeezing application to a malleable retainer adjacent a pocket opening thereof may displace retainer material to confinement by said projecting formations, to thereby define precisely spaced rolling-element retainer lugs.

11. Anvil and staking tool means according to claim 10, and including a base with means for the guided reception and retention of one of said tool elements.

12. Anvil and staking tool means according to claim 10, and including a base having an upwardly facing arcuate surface for supporting the correspondingly formed surface of a bearing retainer ring, said base having an upstanding guide bore extending radially with respect to said arcuate surface, said anvil-tool element having a shank sized to fit and being guided by said bore and positioning said anvil-table portion to face upwardly, and means at said bore to pre-determine the elevation of said anvil-table portion above said arcuate surface in accordance with the radial thickness of the retainer ring to be locally deformed.

13. Anvil and staking tool means according to claim 10, in which the telescoping guide means comprises a central stud on said anvil-tool element and a central socket in said staking-tool element and sized to pilot on said stud.

14. Anvil and staking tool means according to claim 13, in which said sidewall formations are integral parts of said stud.

* * * * *